US012123577B2

(12) United States Patent
Chen

(10) Patent No.: US 12,123,577 B2
(45) Date of Patent: Oct. 22, 2024

(54) HOISTABLE LAMP HAVING HOISTABLE EMERGENCY POWER SUPPLY

(71) Applicant: PHENIX LIGHTING (XIAMEN) CO., LTD., Fujian (CN)

(72) Inventor: Jin Chen, Fujian (CN)

( * ) Notice: Subject to any disclaimer, the term of this patent is extended or adjusted under 35 U.S.C. 154(b) by 0 days.

(21) Appl. No.: 18/590,906

(22) Filed: Feb. 28, 2024

(65) Prior Publication Data

US 2024/0200758 A1 Jun. 20, 2024

(51) Int. Cl.
*F21V 21/008* (2006.01)
*F21V 23/02* (2006.01)

(52) U.S. Cl.
CPC .......... *F21V 21/008* (2013.01); *F21V 23/023* (2013.01)

(58) Field of Classification Search
CPC . F21V 21/008; F21V 21/02; F21S 9/02; F21S 9/022
See application file for complete search history.

(56) References Cited

U.S. PATENT DOCUMENTS

2024/0107721 A1* 3/2024 Gertiser .............. H01L 23/3675

* cited by examiner

*Primary Examiner* — Robert J May

(57) ABSTRACT

A hoistable lamp having hoistable emergency power supply, also including a hoisting piece; wherein the hoistable emergency power source, the lamp shell of the hoistable lamp, and the hoisting piece are connected; the hoistable emergency power source is connected to a power-supply power cable and a dimming signal control cable, and is also connected to a power-taking power cable and a dimming signal input cable of the hoistable lamp. Assembling and disassembling of the hoistable emergency power supply are facilitated.

10 Claims, 8 Drawing Sheets

HOISTABLE LAMP HAVING HOISTABLE EMERGENCY POWER SUPPLY

BACKGROUND OF THE INVENTION

The present invention relates to the field of emergency lighting, and in particular to a hoistable lamp having hoistable emergency power supply.

Existing lamps are generally divided into the following based on mounting modes: wall lamps, desk lamps, street lamps, floor lamps, ceiling lamps, embedded lamps for footlights, hoistable lamps, movable lamps and the like. Hoistable lamps are required to be suspended and hoisted when in use; high bay lamp (also known as UFO lamp) is a common type of hoistable lamp, and high bay lamp is a general name for lamps used during production in factories, mines, warehouses and high sheds.

In order to ensure emergency use of a lamp in case of power failure, many lamps are now provided with an emergency power supply. When an emergency power supply adaptive to a hoistable lamp is used, a power input end and a dimming signal input end of the emergency power supply are connected to a power-supply power cable and a dimming signal control cable respectively, and a power output end and a dimming signal output end of the emergency power supply are connected to a power-taking power cable and a dimming signal input cable of the hoistable lamp respectively; when the power-supply power cable is powered, the emergency power supply is charged, and also, the power-supply power cable supplies power to the hoistable lamp through the emergency power supply; when the power-supply power cable is powered off, the emergency power supply supplies power to the hoistable lamp. Further, when the hoistable lamp and the emergency power supply according to the prior art are used together, the hoistable lamp is connected with a sling chain through the emergency power supply, and such connection requires that when mounting the emergency power supply, the hoistable lamp has to be disconnected from the sling chain first, and then a housing of the emergency power supply has to be connected to the hoistable lamp and the sling chain. Accordingly, when subsequent maintenance is needed for the emergency power supply, the emergency power supply has to be disconnected from the power-taking power cable, the power-supply power cable, the dimming signal input cable and the dimming signal control cable, and also, the housing of the emergency power supply has to be disconnected from the sling chain and the hoistable lamp, thereby resulting in complicated and inefficient disassembling of the emergency power supply. Moreover, when the emergency power supply has to be mounted again after maintenance, the emergency power supply has to be connected to the power-taking power cable, the power-supply power cable, the dimming signal input cable and the dimming signal control cable again, and likewise, the housing of the emergency power supply also has to be connected to the sling chain and the hoistable lamp again, thereby resulting in complicated and inefficient mounting of the emergency power supply.

In view of the above disadvantages in the prior art, there is a need to develop a hoistable lamp having hoistable emergency power supply to facilitate assembling and disassembling of the hoistable emergency power supply.

BRIEF SUMMARY OF THE INVENTION

It is an object of the present invention to provide a hoistable lamp having hoistable emergency power supply to facilitate assembling and disassembling of the hoistable emergency power supply.

To attain the above object, the present invention provides the following technical solutions:

A hoistable lamp having hoistable emergency power supply, comprising said hoistable emergency power supply, said hoistable lamp, and a hoisting piece; wherein the hoistable emergency power source and the hoisting piece are detachably connected; a power input end and a dimming signal input end of the hoistable emergency power supply are connected to a power-supply power cable and a dimming signal control cable respectively; a power output end and a dimming signal output end of the hoistable emergency power supply are connected to a power-taking power cable and a dimming signal input cable of the hoistable lamp respectively; a lamp shell of the hoistable lamp is connected to the hoisting piece.

The hoisting piece is a chain; the hoistable emergency power supply is supplied with at least one hook or at least one binding belt hung onto the hoisting piece.

The hoistable emergency power supply comprises an emergency power supply body and four fast wire connecting terminals, wherein the emergency power supply body comprises a housing and an emergency power supply module in the housing; the emergency power supply module is provided with the power input end, the power output end, the dimming signal input end and the dimming signal output end of the hoistable emergency power supply; the four fast wire connecting terminals are mounted in the housing, and the four fast wire connecting terminals are connected to the power input end, the power output end, the dimming signal input end and the dimming signal output end of the hoistable emergency power supply respectively; a fast wire connecting terminal of the four fast wire connecting terminals connected to the power input end of the hoistable emergency power supply is connected to the power-supply power cable, a fast wire connecting terminal of the four fast wire connecting terminals connected to the dimming signal input end of the hoistable emergency power supply is connected to the dimming signal control cable, a fast wire connecting terminal of the four fast wire connecting terminals connected to the power output end of the hoistable emergency power supply is connected to the power-taking power cable of the hoistable lamp, and a fast wire connecting terminal of the four fast wire connecting terminals connected to the dimming signal output end of the hoistable emergency power supply is connected to the dimming signal input cable of the hoistable lamp; the housing is detachably connected with the hoisting piece.

The housing of the emergency power supply body is provided with four mounting seats which are hollowed, wherein the four mounting seats are detachably connected to waterproof joints respectively; each of the waterproof joints is provided with a hermetic wire-passing hole which a corresponding one of the power-taking power cable, the dimming signal input cable, the power-supply power cable, and the dimming signal control cable is hermetically disposed inside and passes through; the four fast wire connecting terminals are accommodated in the four mounting seats of the housing respectively, and housed by the waterproof joints detachably connected to the four mounting seats respectively.

The waterproof joints are cable glands.

The waterproof joints are detachably connected to the four mounting seats respectively through threaded connection.

The housing of the emergency power supply body comprises a housing main body with an opening at each of two ends of the housing main body, and two housing end covers are attached to the openings at the two ends of the housing main body respectively; each of the two housing end covers are provided with two of the four mounting seats.

A sealing ring is disposed between each of the housing end covers and the housing main body.

At least one hoisting ring is mounting on an outer side of the housing; each hoisting ring is detachably connected to the hoisting piece.

The hoisting piece is a chain; each hoisting ring is supplied with a hook or a binding belt hung onto the hoisting piece.

According to the above technical solutions, when the hoistable emergency power supply has to be disassembled, the hoistable emergency power supply only needs to be disconnected from the power-supply power cable, the power-taking power cable, the dimming signal control cable, the dimming signal input cable, and also the hoisting piece. Therefore, compared with the prior art, the present invention can omit the connection and disconnection between the hoistable emergency power supply and the lamp shell of the hoistable lamp, thus facilitating disassembling of the hoistable emergency power supply. Moreover, mounting of the hoistable lamp is not an issue anymore when the hoistable emergency power supply is mounted again, thereby facilitating subsequent mounting process, or in other words, mounting of the hoistable emergency power supply.

Figure 1:
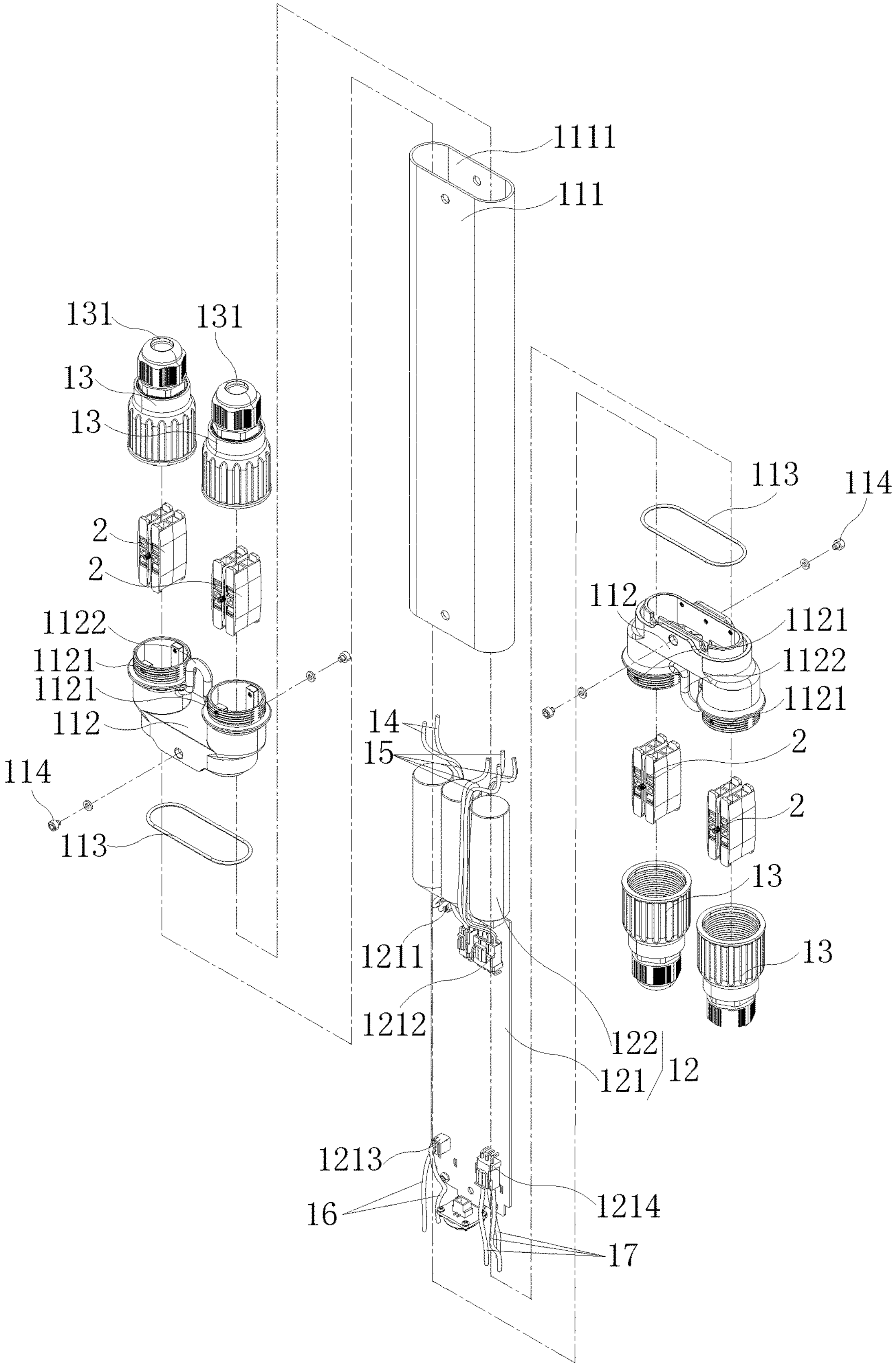
FIG. 1 is an exploded view of the hoistable emergency power supply of the present invention.
Figure 2:
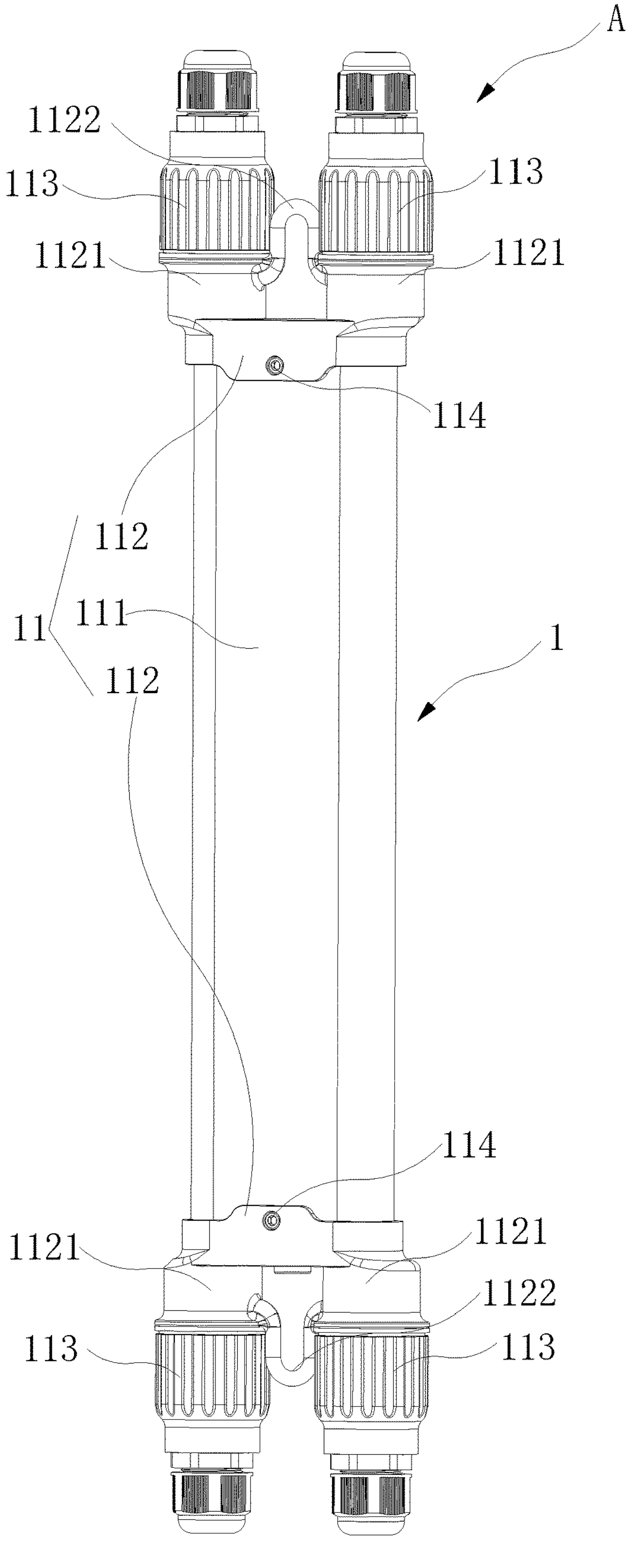
FIG. 2 is a schematic structural diagram of the hoistable emergency power supply of the present invention.
Figure 3:
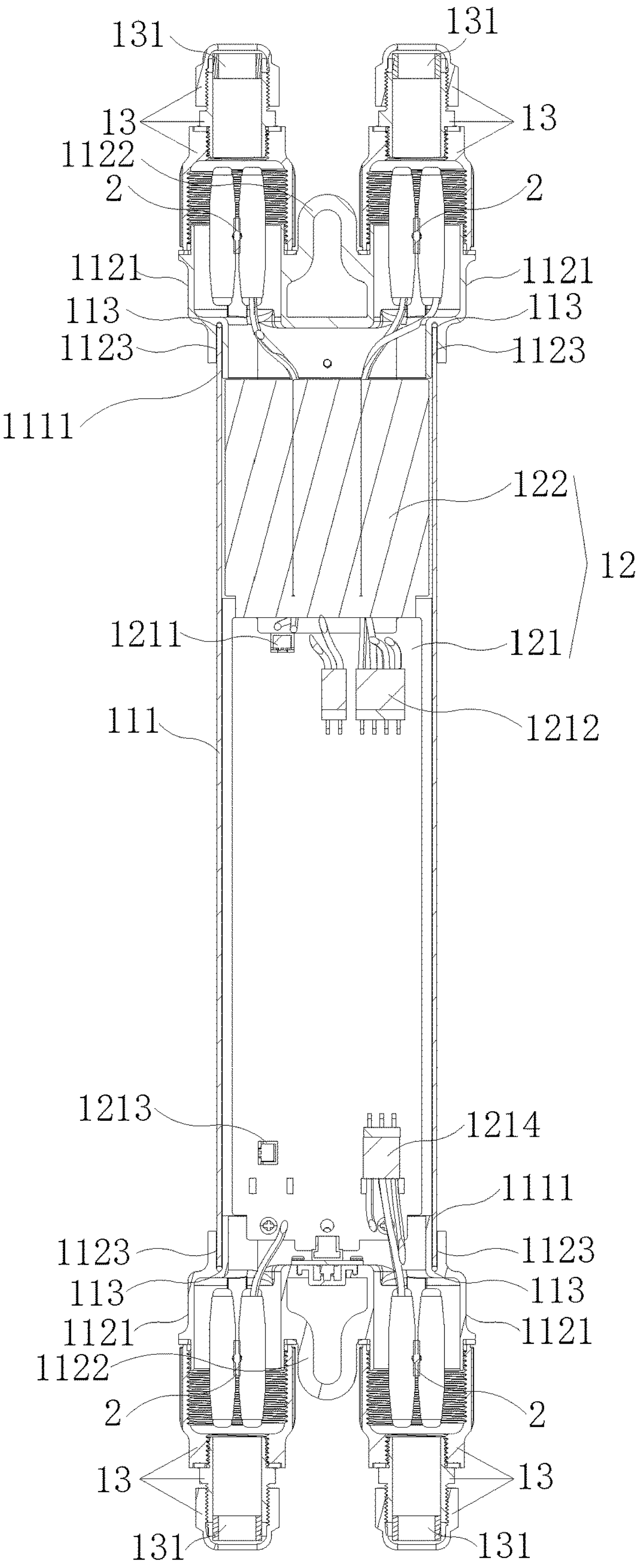
FIG. 3 is a first cross-sectional view of the hoistable emergency power supply of the present invention.
Figure 4:
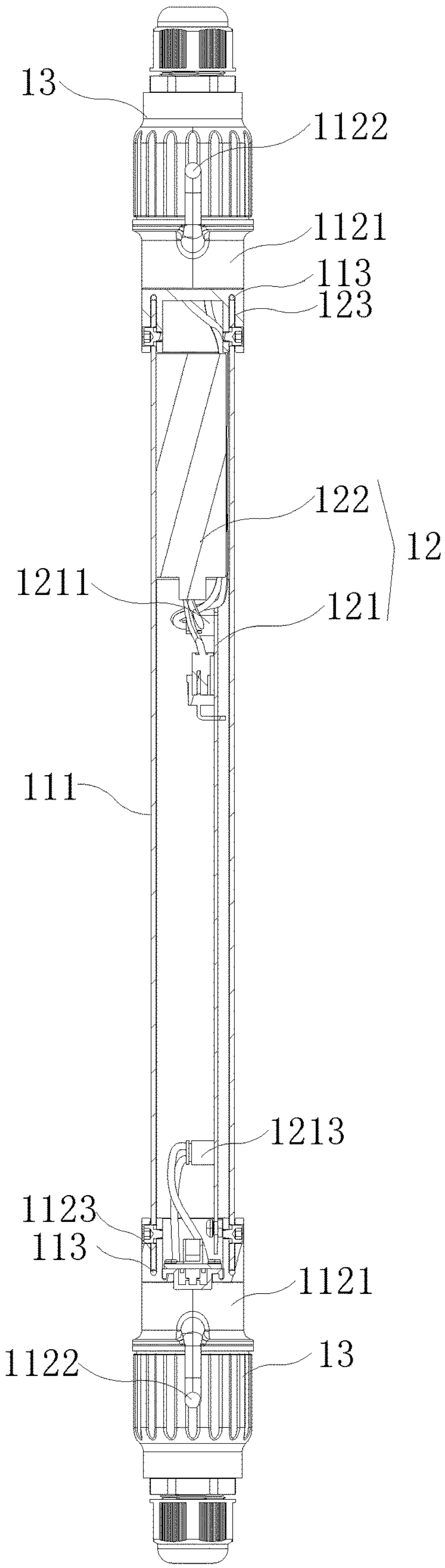
FIG. 4 is a second cross-sectional view of the hoistable emergency power supply of the present invention.
Figure 5:
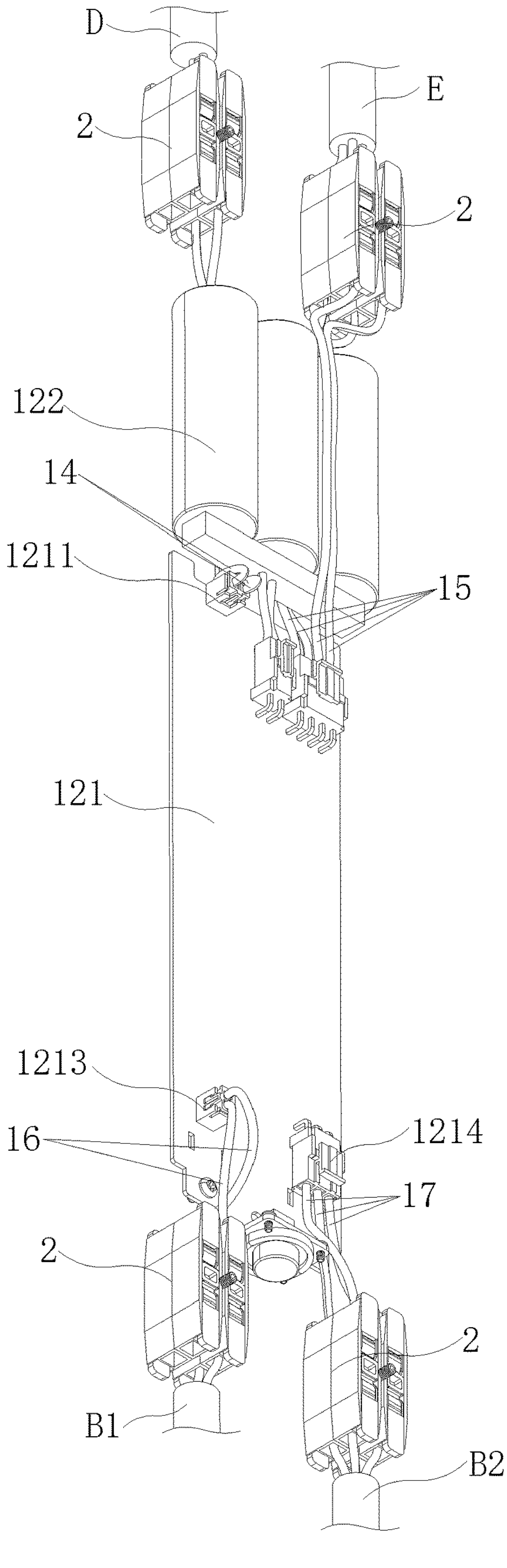
FIG. 5 is a first partial structural view of the present invention.
Figure 6:
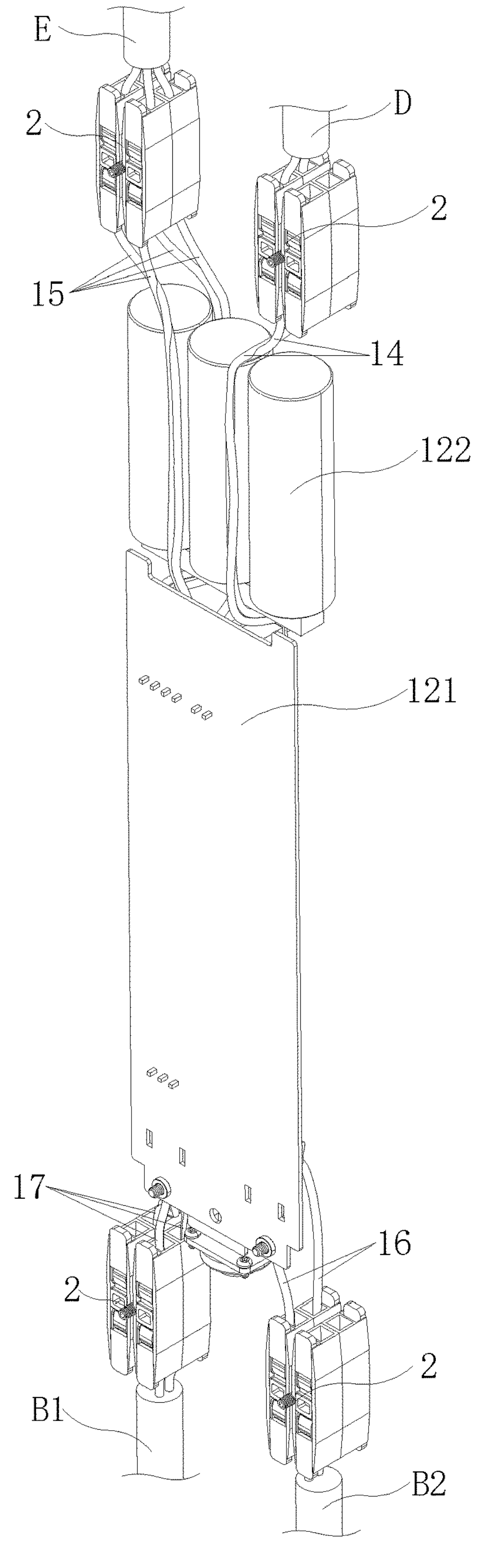
FIG. 6 is a second partial structural view of the present invention.

DESCRIPTION OF REFERENCE NUMERALS hoistable emergency power supply A;
emergency power supply body 1;
housing 11; housing main body 111; opening 1111; housing end cover 112; mounting seat 1121; hoisting ring 1122; annular groove 1123; sealing ring 113; screw 114;
emergency power supply module 12; control circuit board 121; power input end 1211; dimming signal input end 1212; power output end 1213; dimming signal output end 1214; battery 122;
waterproof joint 13; hermetic wire-passing hole 131;
first connecting cables 14;
second connecting cables 15;
third connecting cables 16;
fourth connecting cables 17;
fast wire connecting terminal 2;
hook 3; binding belt 3';
hoistable lamp B; lamp shell B0; power-taking power cable B1; dimming signal input cable B2;
hoisting piece C;

power-supply power cable D; dimming signal control cable E.

DETAILED DESCRIPTION OF THE INVENTION

To further explain the technical solutions of the present invention, a detailed description of the present invention is provided below with reference to specific embodiments.

As shown in FIGS. 1 to 8, the present invention provides a hoistable lamp having hoistable emergency power supply, comprising a hoistable emergency power supply A, a hoistable lamp B, and a hoisting piece C, wherein the hoistable emergency power source A and the hoisting piece C are detachably connected; a power input end 1211 and a dimming signal input end 1212 of the hoistable emergency power supply A are connected to a power-supply power cable D and a dimming signal control cable E respectively; a power output end 1213 and a dimming signal output end 1214 of the hoistable emergency power supply A are connected to a power-taking power cable B1 and a dimming signal input cable B2 of the hoistable lamp B respectively; a lamp shell B0 of the hoistable lamp B is connected to the hoisting piece C.

When the hoistable emergency power supply A has to be disassembled, the hoistable emergency power supply A only needs to be disconnected from the power-supply power cable D, the power-taking power cable B1, the dimming signal control cable E, the dimming signal input cable B2, and also the hoisting piece C. Therefore, compared with the prior art, the present invention can omit the connection and disconnection between the hoistable emergency power supply A and the lamp shell B0 of the hoistable lamp B, thus facilitating disassembling of the hoistable emergency power supply A. Moreover, mounting of the hoistable lamp B is not an issue anymore when the hoistable emergency power supply A is mounted again, thereby facilitating subsequent mounting process, or in other words, mounting of the hoistable emergency power supply A.

In an embodiment of the present invention, the hoistable emergency power supply A comprises an emergency power supply body 1 and four fast wire connecting terminals 2, wherein the emergency power supply body 1 comprises a housing 11 and an emergency power supply module 12 in the housing 11, the emergency power supply module 12 is provided with the power input end 1211, the power output end 1213, the dimming signal input end 1212 and the dimming signal output end 1214 of the hoistable emergency power supply A; the four fast wire connecting terminals 2 are mounted in the housing 11, and the four fast wire connecting terminals 2 are connected to the power input end 1211, the power output end 1213, the dimming signal input end 1212 and the dimming signal output end 1214 of the hoistable emergency power supply A respectively; a fast wire connecting terminal 2 of the four fast wire connecting terminals 2 connected to the power input end 1211 of the hoistable emergency power supply A is connected to the power-supply power cable D, a fast wire connecting terminal 2 of the four fast wire connecting terminals 2 connected to the dimming signal input end 1212 of the hoistable emergency power supply A is connected to the dimming signal control cable E, a fast wire connecting terminal 2 of the four fast wire connecting terminals 2 connected to the power output end 1213 of the hoistable emergency power supply A is connected to the power-taking power cable B1 of the hoistable lamp B, and a fast wire connecting terminal 2 of the four fast wire connecting terminals 2 connected to the dimming signal output end 1214 of the hoistable emergency power supply A is connected to the dimming signal input cable B2 of the hoistable lamp B. Accordingly, the power input end 1211 and the dimming signal input end 1212 of the hoistable emergency power supply A are connected to the power-supply power cable D and the dimming signal control cable E; the power output end 1213 and the dimming signal output end 1214 of the hoistable emergency power supply A are connected to the power-taking power cable B1 and the dimming signal input cable B2 of the hoistable lamp B respectively. Since the fast wire connecting terminals 2 have the advantage of being capable of being quickly assembled and disassembled with cables (without using any tools), the effect of quickly assembling and disassembling the power-taking power cable B1, the dimming signal input cable B2, the power-supply power cable D and the dimming signal control cable E with the four fast wire connecting terminals 2 respectively can be achieved through the fast wire connecting terminals 2, and thus the disassembling and assembling of the hoistable emergency power supply A are further facilitated.

In the present invention, the fast wire connecting terminals 2 are prior art components. As shown in FIG. 1, the fast wire connecting terminals 2 used in the present invention may be buckle type fast wire connecting terminals 2 (the buckle type fast wire connecting terminals may also adopt the structures disclosed in CN305147931S, CN214849114U and CN218940116U). It should be noted that, the fast wire connecting terminals 2 used in the present invention may also be press type fast wire connecting terminals 2 (the press type fast wire connecting terminals may also adopt the structures disclosed in CN213043079U).

In an embodiment of the present invention, the housing 11 of the emergency power supply body 1 is provided with four mounting seats 1121 which are hollowed, wherein the four mounting seats 1121 are detachably connected to waterproof joints 13 respectively; the waterproof joints 13 may be cable glands (as shown in FIG. 1), and each of the waterproof joints 13 is provided with a hermetic wire-passing hole 131 which a cable (i.e., the power-taking power cable B1, the dimming signal input cable B2, the power-supply power cable D, or the dimming signal control cable E) is hermetically disposed inside and passes through; the four fast wire connecting terminals 2 are accommodated in the four mounting seats 1121 of the housing 11 respectively, and housed by the waterproof joints 13 detachably connected to the four mounting seats 1121 respectively. Accordingly, the power-taking power cable B1, the dimming signal input cable B2, the power-supply power cable D, and the dimming signal control cable E are hermetically fitted with the waterproof joints 13 respectively, such that water is prevented from being in contact with a connecting portion between the power-taking power cable B1 and a corresponding fast wire connecting terminal 2, and also prevented from being in contact with a connecting portion between the power-supply power cable D and a corresponding fast wire connecting terminal 2, thereby achieving a waterproof protection effect; the fast wire connecting terminals 2 may be locked with the corresponding mounting seats 1121 through screws to avoid displacement of the fast wire connecting terminals 2.

In an embodiment of the present invention, the waterproof joints 13 are detachably connected to the mounting seats 1121 respectively through threaded connection, such that disassembling and assembling of the waterproof joints 13 are facilitated without using any tools, thereby ensuring fast disassembling and assembling of the hoistable emergency power supply A with the power-taking power cable B1, the dimming signal input cable B2, the power-supply power cable D, and the dimming signal control cable E. It should be noted that, the waterproof joints 13 may also be connected to the mounting seats 1121 by using other detachable connection structures, for example, the waterproof joints 13 may be detachably connected to the mounting seats 1121 by buckling.

Figure 7:
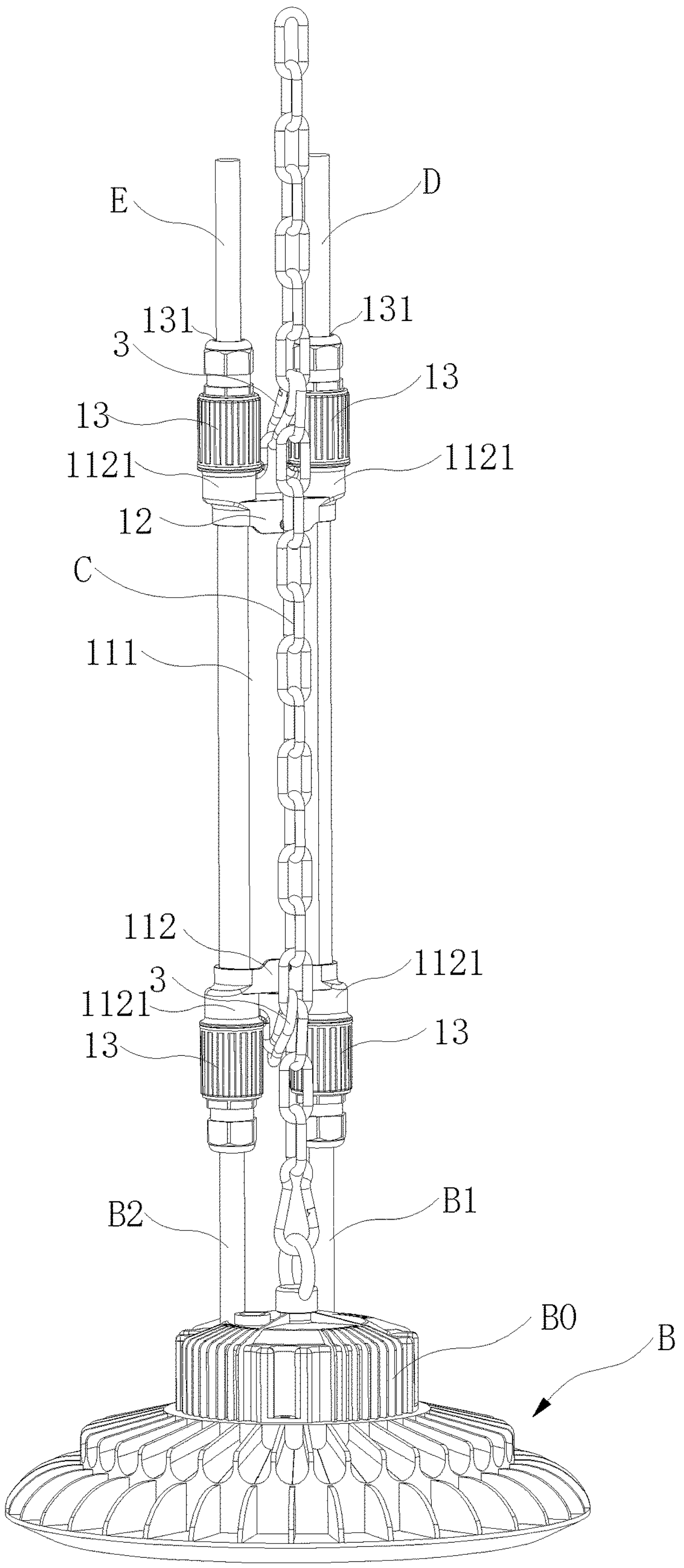
FIG. 7 is a schematic diagram of the present invention.
Figure 8:
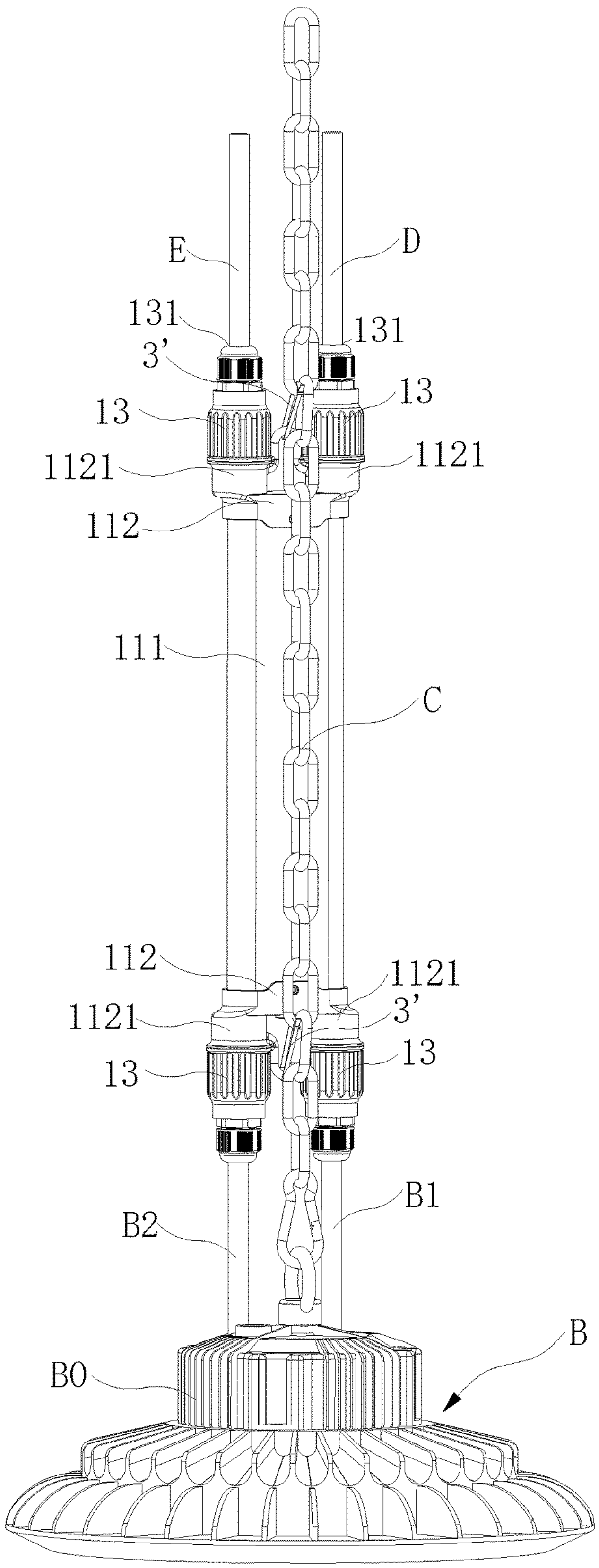
FIG. 8 is a schematic diagram of the present invention according to another embodiment.

In an embodiment of the present invention, at least one hoisting ring 1122 is mounting on an outer side of the housing 11; each hoisting ring 1122 is detachably connected to the hoisting piece C to suspend and hoist the hoistable emergency power supply A. As shown in FIG. 7, the hoisting piece C is a chain (i.e., the hoisting piece C is a sling chain), while each hoisting ring 1122 may be supplied with a hook 3 (i.e., the hoistable emergency power supply A is supplied with at least one hook 3), and each hook 3 can directly hang onto the hoisting piece C (i.e., the hoisting ring 1122 is connected with the hoisting piece C through the hook 3) to achieve the detachable connection between the hoistable emergency power supply A and the hoisting piece C. Accordingly, disassembling and assembling between the hoistable emergency power supply A and the hoisting piece C are very simple and convenient. It should be noted that, as shown in FIG. 8, each hoisting ring 1122 may be supplied with a binding belt 3' (i.e., the hoistable emergency power supply A is supplied with at least one binding belt 3') instead of the hook 3, and each binding belt 3' may be directly tied to the hoisting piece C (i.e., the hoisting ring 1122 is connected with the hoisting piece C through the binding belt 3') to achieve the detachable connection between the hoistable emergency power supply A and the hoisting piece C. Accordingly, disassembling and assembling between the hoistable emergency power supply A and the hoisting piece C are also very simple and convenient.

In an embodiment of the present invention, the housing 11 of the emergency power supply body 1 comprises a housing main body 111 with an opening 1111 at each of two ends of the housing main body 111, and two housing end covers 112 are attached to the openings 1111 at the two ends of the housing main body 111 respectively; each of the housing end covers 112 is provided with two of the four mounting seats 1121 and one of said at least one hoisting ring 1122. The housing end covers 112 are detachably attached with the housing main body 111, such that the housing 11 of the emergency power supply body 1 can be removed during maintenance to maintain the emergency power supply module 12; specifically, the housing end covers 112 and the housing main body 111 may be locked through screws 114, such that the housing end covers 112 and the housing main body 111 can be stably connected, and the disassembling and assembling between the housing end covers 112 and the housing main body 111 are facilitated; each of the housing end covers 112 is provided with an annular groove 1123 in which a corresponding end of the housing main body 111 is inserted, such that connection between the housing end covers 112 and the housing main body 111 is more stable; a sealing ring 113 is disposed between each of the housing end covers 112 and the housing main body 111 to ensure waterproof performance of the housing 11.

In an embodiment of the present invention, the emergency power supply module 12 comprises a control circuit board 121 and batteries 122 connected to the control circuit board 121, wherein the control circuit board 121 is provided with the power input end 1211, the power output end 1213, the dimming signal input end 1212, and the dimming signal output end 1214 of the hoistable emergency power supply A.

The power input end 1211 is connected to the fast wire connecting terminal connected to the power-supply power cable D through first connecting cables 14; the dimming signal input end 1212 is connected to the fast wire connecting terminal connected to the dimming signal control cable E through second connecting cables 15; the power output end 1213 is connected to the fast wire connecting terminal connected to the power-taking power cable B1 through third connecting cables 16; the dimming signal output end 1214 is connected to the fast wire connecting terminal connected to the dimming signal input cable B2 through fourth connecting cables 17. A specific circuit structure of the control circuit board 121 is prior art and will not be described herein again.

The above embodiments and illustrations are not intended to limit the form and style of the product of the present invention. Any appropriate variations or modifications made by those of ordinary skills in the art within the scope of the present invention shall be considered as falling within the scope of the patent.

What is claimed is:

1. A hoistable lamp having hoistable emergency power supply, comprising said hoistable emergency power supply, said hoistable lamp, and a hoisting piece;

wherein the hoistable emergency power source and the hoisting piece are detachably connected; a power input end and a dimming signal input end of the hoistable emergency power supply are connected to a power-supply power cable and a dimming signal control cable respectively; a power output end and a dimming signal output end of the hoistable emergency power supply are connected to a power-taking power cable and a dimming signal input cable of the hoistable lamp respectively; a lamp shell of the hoistable lamp is connected to the hoisting piece.

2. The hoistable lamp having hoistable emergency power supply according to claim 1, wherein the hoisting piece is a chain; the hoistable emergency power supply is supplied with at least one hook or at least one binding belt hung onto the hoisting piece.

3. The hoistable lamp having hoistable emergency power supply according to claim 1, wherein the hoistable emergency power supply comprises an emergency power supply body and four wire connecting terminals, wherein the emergency power supply body comprises a housing and an emergency power supply module in the housing; the emergency power supply module is provided with the power input end, the power output end, the dimming signal input end and the dimming signal output end of the hoistable emergency power supply; the four wire connecting terminals are mounted in the housing, and the four wire connecting terminals are connected to the power input end, the power output end, the dimming signal input end and the dimming signal output end of the hoistable emergency power supply respectively;

a wire connecting terminal of the four wire connecting terminals connected to the power input end of the hoistable emergency power supply is connected to the power-supply power cable, a wire connecting terminal of the four wire connecting terminals connected to the dimming signal input end of the hoistable emergency power supply is connected to the dimming signal control cable, a wire connecting terminal of the four wire connecting terminals connected to the power output end of the hoistable emergency power supply is connected to the power-taking power cable of the hoistable lamp, and a wire connecting terminal of the four wire connecting terminals connected to the dimming signal output end of the hoistable emergency power supply is connected to the dimming signal input cable of the hoistable lamp; the housing is detachably connected with the hoisting piece.

4. The hoistable lamp having hoistable emergency power supply according to claim 3, wherein the housing of the emergency power supply body is provided with four mounting seats which are hollowed, wherein the four mounting seats are detachably connected to waterproof joints respectively; each of the waterproof joints is provided with a hermetic wire-passing hole which a corresponding one of the power-taking power cable, the dimming signal input cable, the power-supply power cable, and the dimming signal control cable is hermetically disposed inside and passes through;

the four wire connecting terminals are accommodated in the four mounting seats of the housing respectively, and housed by the waterproof joints detachably connected to the four mounting seats respectively.

5. The hoistable lamp having hoistable emergency power supply according to claim 4, wherein the waterproof joints are cable glands.

6. The hoistable lamp having hoistable emergency power supply according to claim 4, wherein the waterproof joints are detachably connected to the four mounting seats respectively through threaded connection.

7. The hoistable lamp having hoistable emergency power supply according to claim 3, wherein the housing of the emergency power supply body comprises a housing main body with an opening at each of two ends of the housing main body, and two housing end covers are attached to the openings at the two ends of the housing main body respectively; each of the two housing end covers are provided with two of the four mounting seats.

8. The hoistable lamp having hoistable emergency power supply according to claim 7, wherein a sealing ring is disposed between each of the two housing end covers and the housing main body.

9. The hoistable lamp having hoistable emergency power supply according to claim 3, wherein at least one hoisting ring is mounting on an outer side of the housing; each hoisting ring is detachably connected to the hoisting piece.

10. The hoistable lamp having hoistable emergency power supply according to claim 9, wherein the hoisting piece is a chain; each hoisting ring is supplied with a hook or a binding belt hung onto the hoisting piece.

* * * * *